United States Patent [19]

Wachs et al.

[11] 4,228,401
[45] Oct. 14, 1980

[54] COMMUNICATION SATELLITE TRANSPONDER INTERCONNECTION UTILIZING VARIABLE BANDPASS FILTER

[75] Inventors: Marvin R. Wachs, Rockville; Arnold Berman, Kensington, both of Md.

[73] Assignee: Communications Satellite Corporation, Washington, D.C.

[21] Appl. No.: 863,562

[22] Filed: Dec. 22, 1977

[51] Int. Cl.[2] ............................................. H04B 7/14
[52] U.S. Cl. ............ 455/12; 343/100 ST; 455/17, 22
[58] Field of Search .................. 325/1, 2, 3, 4, 7, 9, 325/10, 11, 14; 370/57, 75; 333/1, 2; 330/126; 343/100 ST, 18 B, 100 CS, 176, 179

[56] References Cited

U.S. PATENT DOCUMENTS

| | | | |
|---|---|---|---|
| 3,678,387 | 7/1972 | Wilson | 325/11 |
| 3,806,653 | 4/1974 | Sommer | 179/15 FE |
| 3,810,255 | 5/1974 | Wachs | 325/3 |
| 3,917,998 | 11/1975 | Welti | 325/3 |
| 4,001,691 | 1/1977 | Gruenberg | 343/100 CS |
| 4,002,980 | 1/1977 | Herz | 325/3 |
| 4,024,350 | 5/1977 | Deman | 179/15 FS |

Primary Examiner—Robert L. Griffin
Assistant Examiner—Michael A. Masinick
Attorney, Agent, or Firm—Sughrue, Rothwell, Mion, Zinn and Macpeak

[57] ABSTRACT

Frequency bands in spot beams received by a satellite transponder are selectively routed to transmitted spot beams. The total band width from each spot beam receiver is divided among a plurality of independently adjustable variable bandpass filters, and the outputs from the selected bandpass filters at each receiver are combined at the spot beam transmitters so that each downlink spectrum is made up of a frequency multiplex of selected bands from each uplink spot beam.

9 Claims, 5 Drawing Figures

COMMUNICATION SATELLITE TRANSPONDER INTERCONNECTION UTILIZING VARIABLE BANDPASS FILTER

BACKGROUND OF THE INVENTION

This invention is generally related to satellite transponders and, more specifically, to frequency translation routing transponders.

As the traffic demands on commercial communication satellites increase, new techniques must be employed to expand communication capacity. The capacity of a given communication system is determined by the availability of two resources, bandwidth and r.f. power, or signal-to-noise ratio. Bandwidth is normally limited by legal allocation while signal-to-noise ratio is a function of available launch vehicle weight lifting capability and earth station characteristics.

By providing multiple isolated propagation channels, the same allocated frequency spectrum may be reused, thus N-fold increasing the bandwidth resource. The isolation mechanism may be the use of two orthogonal antenna polarizations or spatial pointing isolation provided by spot beams. It is this latter method to which the present invention is directed.

The use of spot beams is one technique for increasing information capacity per bandwidth in a communication satellite system and essentially consists of incorporating multiple antennae on the satellite transponder for transmitting and receiving signals from designated areas on the earth. The beams, known as spot beams, provide spatial diversity and allow multiple communications within the same band. For example, if locations A, B, C and D were "illuminated" (covered by the beam pattern) by spot beams 1, 2, 3 and 4, respectively, a frequency channel occupied by communications from A to B could also be occupied by communications from C to D. This assumes that means are provided in the satellite to interconnect signals from receive beam 1 to transmit beam 2 to interconnect signals from receive beam 3 to transmit beam 4.

For full capacity realization of a multi-spot beam system, there should be means for adjustably interconnecting all or a portion of any receive beam bandwidth to any transmit beam. One such system is described in U.S. Pat. No. 3,810,255, entitled "Frequency Translation Routing Communications Transponder," assigned to the same assignee as the present application. In that system, a plurality of spot beam receiving antennae, e.g., three, each receive a spot beam occupying the same bandwidth, and each received signal is supplied to an N-port filter where it is divided into frequency bands (hereinafter referred to as "band slots" or "slots") which may be individually routed. Each slot is supplied to a mixer where it is mixed with a unique local oscillator signal. The resulting 3 N slots are combined in a power combiner, and the composite signal is fed to a frequency selective power splitter where it is split into three bandwidth segments. Each bandwidth segment is applied to a mixer, down-converted to the desired transmit frequency by a different local oscillator signal, and transmitted via the three transmit beams.

The above-described system, although highly effective, has proven somewhat unsatisfactory in its routing capability. Since the N-port filter at each receive beam antenna divides the received signal into N discrete bandwidths, the ability of the system to allocate te minimum possible bandwidth to each transmit antenna is limited to combinations of those bandwidths, thereby resulting in overall system inefficiency. By way of example, let us assume that a 5-port filter is provided at each receive beam antenna for separating the received signal into five equal discrete bandwidths. If the received signal occupies a 0.5 GHz bandwidth, each of the five output signals from the filter will occupy a 0.1 GHz bandwidth. Let us further assume that the system includes three receive beam antennae A, B and C and three transmit beam antennae AA, BB and CC. If only three channels, one at each of antennae A, B and C, are to be transmitted by antenna AA, it will be necessary to allocate to transmit antenna AA one discrete 0.1 GHz bandwidth from each antenna. This results in a routing inefficiency since a 0.3 GHz bandwidth is much greater than that required for three channels. It would be possible to increase the efficiency of the system by decreasing the size of the discrete bandwidths—i.e., providing a 10-port filter rather than a 5-port filter at each receive beam antenna—but this would result in a substantial increase in the weight of the transponder which is highly undesirable in the satellite environment. Moreover, even a 5-port filter is undesirably large for a satellite transponder system in view of its limited efficiency.

SUMMARY OF THE INVENTION

Accordingly, it is an object of this invention to provide a satellite transponder interconnection system in which the efficiency/weight considerations are much more favorable than in prior art transponders.

It is a further object of this invention to provide a satellite transponder in which the size of the band slot from any given received signal which is routed to any given transmitter can be precisely tailored to the communication demand at any time.

It is a still further object of this invention to provide a satellite transponder in which the center frequency of the band slot from a received signal which is routed to a given transmitter can be varied over the entire band of the composite signal.

Briefly, the transponder according to the present invention includes a plurality of receive beam antennae, a plurality of independently adjustable variable bandpass filters for dividing the received signal at each antenna into a plurality of slots of variable bandwidth and center frequency, a plurality of combiners, each combiner for receiving and combining the output signals from a single bandpass filter at each receive beam antenna, and a transmit beam antenna for receiving and transmitting the output signal from each combiner. The variable bandpass filters provide precise control over the bandwidth and center frequency of the band slot from each receive beam antenna which is to be allocated to each transmit antenna, thereby increasing the efficiency of the transponder.

DETAILED DESCRIPTION OF THE PREFERRED EMBODIMENT

Figure 1:
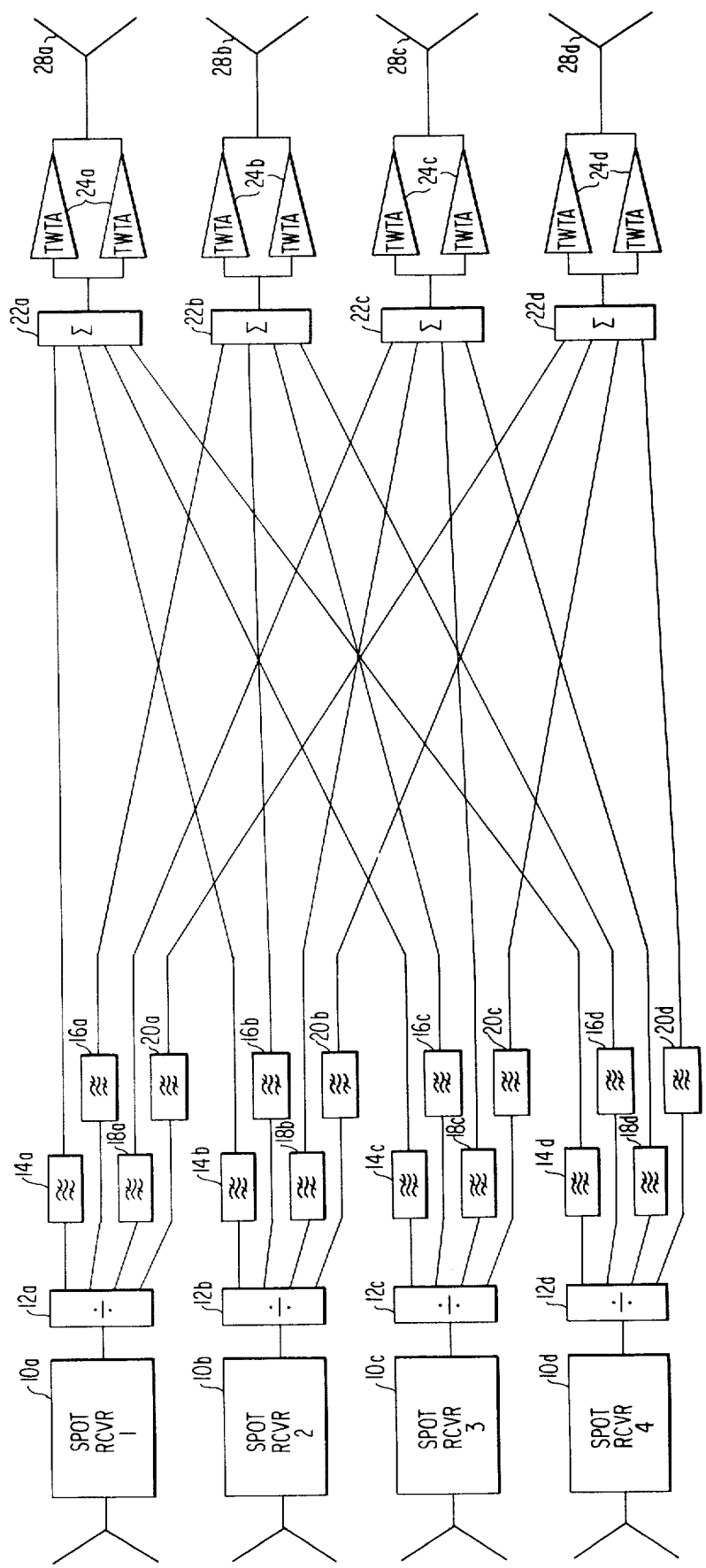
FIG. 1 is a block diagram of a frequency translation routing commuciations transponder according to the present invention.

FIG. 1 is a general block diagram of the interconnection system of a frequency translation routing communications transponder according to the present invention. In order to facilitate the explanation of the transponder shown in FIG. 1, certain specific frequencies will be used as examples; however, it should be understood that these frequencies are used as examples only and the invention is in no way limited thereto. The transponder includes four spot beam receivers 10a-10d for receiving and band limiting four sport beams, each spot beam occupying the 14.0-14.5 GHz band. Four-way passive power splitters 12a-12d receive the outputs from each of the spot beam receivers 10a-10d, respectively, each power splitter providing at each of its four output ports a replica of the signal at its input port. The output signals from each power splitter are supplied to four variable bandpass filters 14-20. Each of the filters 14 passes a different portion of the 14.0-14.5 GHz band from its respective spot beam receiver, and the outputs of these filters are combined in passive power combiner 22a. The composite signals are then amplified and transmitted by amplifier 24a and spot beam transmitting antenna 28a. Likewise, bandpass filters 16 each pass a select portion of the 14.0-14.5 GHz bandwidth, and the outputs of these filters are combined in a combiner 22b. That composite signal is then amplified by amplifier 24b and transmitted from spot beam transmitting antenna 28b. The remaining filters and transmitters are connected in a similar manner. Thus, each downlink spectrum is made up of a frequency multiplex of the outputs from corresponding bandpass filters at each of the spot beam receivers. By using variable bandpass filters, the size and location of the band slot from each spot beam receiver which is allocated to each transmitter can be precisely controlled, thus significantly increasing the efficiency of the transponder. For example, if spot beam receiver 10a receives only a single channel which is to be transmitted from spot beam transmitter 28a, variable bandpass filter 14a may be adjusted to pass only the minimum possible portion of the 0.5 GHz band so that a larger portion of the transmission bandwidth of spot beam transmitter 28a may be allocated to handle channels from spot beam receivers 10b-10d.

Figure 2:
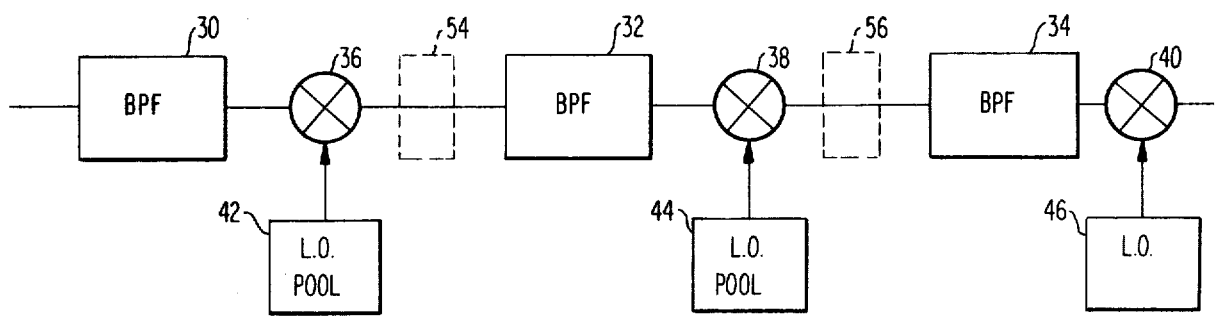
FIG. 2 is a block diagram of one example of a variable bandpass filter which could be used in the transponder shown in FIG. 1.
Figure 3A:
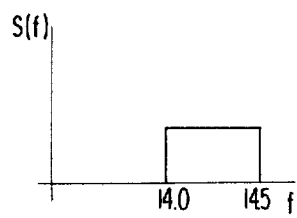
FIGS. 3a–3d are graphs of the signals existing at various stages within the bandpass filter of FIG. 2.
Figure 3B:
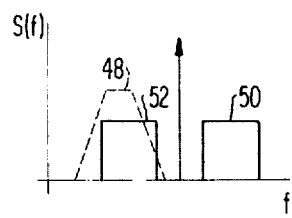
Figure 3C:
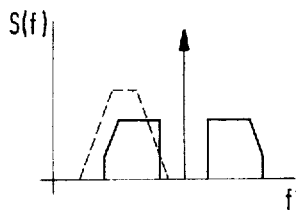
Figure 3D:
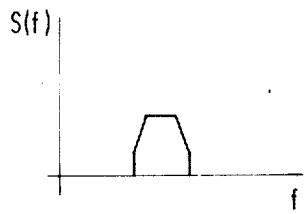

FIG. 2 is a block diagram of a variable bandpass filter which may be used in the transponder shown in FIG. 1. The variable bandpass filter includes three fixed bandpass filters 30, 32 and 34, mixers 36, 38 and 40 and local oscillator signal sources 42, 44 and 46. Filter 30 is a fixed 14.0-14.5 GHz bandpass filter which passes only the 14.0-14.5 GHz band as shown in FIG. 3a. This signal is frequency translated in a mixer 36 fed by a local oscillator signal source 42 whose frequency can be varied in steps between 15460 and 14460 MHz. The translated band is filtered by a 640-960 MHz steep-sided bandpass filter and, depending on the particular frequency chosen for the local oscillator signal source 42, a portion of the I.F. band will pass through the filter 32 as shown in FIG. 3b. The pass band of filter 32 is indicated by the dotted line 48 in FIG. 3b while the upper and lower sidebands resulting from the mixer 36 are shown at 50 and 52, respectively. The output of filter 32 is frequency translated in a second mixer 38 fed by a local oscillator signal source 44 whose frequency is variable between 1280 and 1920 MHz. The translated band is then filtered by a second 640-960 MHz filter 34 identical to filter 32. This filtering is diagrammatically illustrated in FIG. 3c. The output of the bandpass filter 34 is up-converted in a mixer 40, fed by a local oscillator 46, to the desired spot beam transmit frequency. Thus, the final result is a variable bandpass filter having a transfer function as shown in FIG. 3d, and by properly selecting the local oscillator frequencies a bandpass filter function having a desired center frequency and bandwidth (up to 320 MHz) can be synthesized. The output of the filter shown in FIG. 2 is combined with the outputs of the corresponding filters from the remaining receivers as shown in FIG. 1. Alternatively, the outputs of the final bandpass filters 34 in each of the variable bandpass filters could be combined in the passive combiners 22a-22d, and upconversion to the desired transmit could be performed after combining.

Due to weight consideration, it is preferable that the local oscillator frequencies supplied to mixers 36 and 38 be supplied from a local oscillator pool rather than from individual local oscillator. A suitable local oscillator frequency pool is described in my above-mentioned prior U.S. Pat. No. 3,810,255 and need not be discussed in detail here.

The operation of the variable bandpass filter of FIG. 2 is more clearly shown by the following example.

EXAMPLE 1

A 14.0-14.5 GHz composite signal is received by receiver 10a and supplied by passive power splitter 12a to variable bandpass filters 14a-20a, each of which is of the type shown in FIG. 1. If a large number of channels must be routed to transmitter 28a, it may be desirable to precisely allocate the 14.0-14.22 GHz band slot to that antenna. To accomplish this, the local oscillator signals supplied to mixers 36, 38 and 40 may be set at 14860, 1600 and 11060 MHz, respectively. With these L.O. frequencies, the output of mixer 36 will be at 360-860 MHz, and only the 640-860 band will be passed by filter 32. The output of mixer 38 will be at 740-960 MHz, and that entire band will be passed by filter 34. This band slot is then up-converted in mixer 40 to occupy the 11.8-12.02 GHz slot in the 11.7-12.2 GHz transmit signal. It will be understood that the 360-860 MHz difference frequency output is inverted with respect to the 14.0-14.5 GHz input signal, and thus, the 640-860 MHz slot which is passed by filter 32 corresponds to the 14.0-14.22 slot of the composite signal from power splitter 12a. It will also be understood that by varying the L.O. frequency in mixer 40 between 11060 and 11240 MHz, the selected band slot may be made to occupy any part of the transmit band.

EXAMPLE 2

If traffic demands are such that only a very few channels received by spot receiver 10 a are to be transmitted by antenna 28a, it may be desirable to pass only a very narrow 14.34-14.38 band slot by filter 14a. This may be accomplished by setting the L.O. frequencies of mixers 36, 38 and 40 at 15300, 1880 and 11060 MHz, respectively. The output of mixer 36 will be at 800-1300 MHz, and only the 800-960 MHz portion will be passed by filter 32. The output of mixer 38 will be at 920-1080 MHz, and only the 920-960 MHz portion will be passed by filter 34. The output of filter 34 would then be up-converted to occupy the 11.98-12.02 GHz slot of the transmit signal.

The operation of the remaining filters will be apparent to one of ordinary skill in the art. For example, if the L.O. signal supplied to mixer 40 in Examiner 1 were changed to 10960, then the slot passed by filter 14a would occupy the 11.7-11.92 GHz band. If only a few channels from receiver 10b must be sent by transmitter 28a, filter 14b may be set as in Example 2, except that the L.O. signal supplied to mixer 40 in filter 14b may be changed to 11000 MHz so that the slot passed by filter 14b will occupy the 11.92-11.96 GHz band. The other filter outputs may be controlled and combined in a similar manner, in each case controlling the bandwidth and center frequency of the filter function of each variable bandpass filter to meet the needs of that particular channel at that time.

In order to maintain precise control over the pass bands of the variable bandpass filters, it is important that the two fixed bandpass filters 32 and 34 display high skirt selectivity. Surface acoustic wave technology has been demonstrated which is capable of producing filters weighing less than an ounce having the requisite 40% bandwidth and rapid fall-off at frequencies in the region of 1 GHz. The approximately 35 dB insertion loss associated with each of the fixed bandpass filters can be compensated for by filters 54 and 56, shown in dotted outline in FIG. 2, which may be broad band hybrid amplifiers presently available in chip form from many sources.

What is claimed is:

1. A communications satellite transponder comprising:
   means for receiving a plurality of composite signals occupying overlapping frequency bands;
   a plurality of groups of variable bandpass filters, each group of filters receiving a different one of said composite signals from said receiving means, and each filter within each group passing a selected portion of the frequency band of its composite signal; and
   combining means for combining the outputs from said variable bandpass filters into a plurality of composite transmission signals occupying overlapping frequency bands.

2. A communications satellite transponder according to claim 1 wherein the bandwidths and center frequencies of the selected portions passed by each filter are variable.

3. A communications satellite transponder according to claim 1 wherein each of said composite transmission signals comprises a combination of the output signals from selected variable bandpass filters in each group, said selected variable bandpass filters having substantially non-overlapping pass bands.

4. A communications satellite transponder according to claim 1 wherein each variable bandpass filter comprises:
   first variable frequency translation means for frequency translating the composite signal from its respective receiving means;
   a first fixed bandpass filter for passing a portion of said frequency translated composite signal;
   second variable frequency translation means for frequency translating the output signal of said first fixed bandpass filter; and
   a second fixed bandpass filter for passing as its output signal a portion of the output signal from said second frequency translation means.

5. A communications satellite transponder according to claim 4 wherein said first frequency translation means comprises a first mixer supplied with a local oscillator signal from a first independently variable local oscillator signal supply means, and wherein said second frequency translation means comprises a second mixer supplied with a second local oscillator signal from a second independently variable local oscillator supply means, whereby the center frequency and bandwidth of the transfer function of each variable bandpass filter can be controlled through proper selection of the local oscillator signals supplied by said first and second independently variable local oscillator signal supply means.

6. A communications satellite transponder according to claim 5 further comprising a third frequency translation means for converting the output signal of said second fixed bandpass filter to a suitable transmission frequency band.

7. A communications satellite transponder according to claim 5 wherein each variable bandpass filter further comprises first and second amplifiers for receiving the output signals from said first and second frequency translation means, respectively, and providing amplified frequency translated signals as inputs to said fixed bandpass filters.

8. A communications satellite transponder according to claim 5 wherein said variable bandpass filter further comprises a third fixed bandpass filter for passing said composite signal to the input of said first frequency translation means.

9. A communications satellite transponder according to claim 8 where each of said composite transmission signals comprises a combination of the output signals from selected variable bandpass filters in each group, said selected variable bandpass filters having substantially non-overlapping pass bands.

* * * * *